United States Patent
Kanai

(10) Patent No.: US 8,417,106 B2
(45) Date of Patent: Apr. 9, 2013

(54) FOCUS DETECTION DEVICE

(75) Inventor: Moriyasu Kanai, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 55 days.

(21) Appl. No.: 12/834,159

(22) Filed: Jul. 12, 2010

(65) Prior Publication Data
US 2011/0013898 A1    Jan. 20, 2011

(30) Foreign Application Priority Data

Jul. 14, 2009 (JP) .................... 2009-165977
Jul. 6, 2010 (JP) .................... 2010-153833

(51) Int. Cl.
*G03B 3/00* (2006.01)

(52) U.S. Cl. .................................................. 396/128

(58) Field of Classification Search ............. 396/104, 396/114, 128; 250/201.2, 201.6, 201.8; 348/180, 348/187, 188
See application file for complete search history.

(56) References Cited

U.S. PATENT DOCUMENTS

| | | | |
|---|---|---|---|
| 4,859,842 A | 8/1989 | Suda et al. | |
| 5,856,664 A | 1/1999 | Suzuki et al. | |
| 5,870,635 A | 2/1999 | Shindo et al. | |
| 5,940,635 A | 8/1999 | Sensui | |
| 6,128,444 A | 10/2000 | Sensui | |
| 6,188,845 B1 | 2/2001 | Sensui | |
| 6,188,846 B1 | 2/2001 | Sensui | |
| 6,297,909 B1 | 10/2001 | Sensui | |
| 6,332,061 B1 * | 12/2001 | Arita ........................ 396/104 |
| 6,370,333 B1 | 4/2002 | Sensui | |
| 6,393,219 B1 | 5/2002 | Sensui | |
| 6,618,560 B2 | 9/2003 | Sensui | |
| 6,859,619 B2 | 2/2005 | Kurosawa | |
| 6,871,018 B2 | 3/2005 | Nakata | |
| 6,922,526 B2 | 7/2005 | Nakata et al. | |
| 6,937,818 B2 | 8/2005 | Nakata et al. | |
| 7,049,571 B2 | 5/2006 | Nakata et al. | |
| 7,460,779 B2 | 12/2008 | Nakata | |
| 7,493,034 B2 | 2/2009 | Nakata | |
| 7,502,065 B2 | 3/2009 | Nakahara | |
| 7,515,201 B2 | 4/2009 | Nakahara | |
| 7,515,819 B2 | 4/2009 | Takahashi | |
| 7,526,192 B2 | 4/2009 | Nakahara | |
| 7,657,169 B2 | 2/2010 | Nakahara | |

(Continued)

FOREIGN PATENT DOCUMENTS

| | | |
|---|---|---|
| JP | 2-272410 | 11/1990 |
| JP | 7-74855 | 8/1995 |

(Continued)

OTHER PUBLICATIONS

JP2006-072215A Machine Translation available from JPO website.*

*Primary Examiner* — W B Perkey
*Assistant Examiner* — Minh Phan
(74) *Attorney, Agent, or Firm* — Greenblum & Bernstein, P.L.C.

(57) ABSTRACT

A focus detection device, which detects a defocus amount based on a phase difference between a pair of object images that are obtained by pupil division and projected onto a pair of areas on a line sensor, includes a parallel line sensor having two line sensor arrays arranged adjacently in parallel, and a correction calculator which corrects the defocus amount according to a phase difference between output signals of the two line sensor arrays of the parallel line sensor.

7 Claims, 9 Drawing Sheets

U.S. PATENT DOCUMENTS

| | | |
|---|---|---|
| 7,773,874 B2 | 8/2010 | Nakahara |
| 2001/0008580 A1 | 7/2001 | Sensui |
| 2006/0077280 A1 | 4/2006 | Nakahara |
| 2008/0285966 A1 | 11/2008 | Kanai |

FOREIGN PATENT DOCUMENTS

| | | |
|---|---|---|
| JP | 2002-174766 | 6/2002 |
| JP | 2005-300844 | 10/2005 |
| JP | 2006072215 A * | 3/2006 |

* cited by examiner

No Phase Difference

Phase Difference P

Angle θ

FOCUS DETECTION DEVICE

BACKGROUND OF THE INVENTION

1. Field of the Invention

The present invention relates to a focus detection device using a pupil division phase-difference focus detection method.

2. Description of the Related Art

In a focus detection device which is install in a single-lens reflex (SLR) camera, in the case where a pupil division phase-difference focus detection method is employed, a pair of object images obtained by pupil division are projected onto a pair of areas on a line sensor, and a defocus amount is obtained from a phase difference between the pair of object images on the line sensor. Specifically, when an interval between the pair of object images formed on the line sensor is a predetermined length, focusing is attained; when the interval is smaller than the predetermined length, it is judged as a front focus; and when the interval is larger than the predetermined length, it is judged as a rear focus. The amount of defocusing from an in-focus position is output as a defocus amount.

In regard to pupil division phase-difference focus detection methods, vertical line detection, horizontal line detection, and cross-type detection are known in the art. The vertical line detection method detects a focus state of an object that has a contrast component in a horizontal direction. The horizontal line detection method detects a focus state of an object that has a contrast component in a vertical direction. In the cross-type detection method, both the vertical line detection and the horizontal line detection are performed.

For example, Japanese Examined Patent Publication No. H07-74855 teaches a cross-type focus detection method in which a phase difference is obtained from a value (synthesized sensor output) obtained by the sum of the outputs of vertical and horizontal line sensor arrays, whereby enhancing the focus detection accuracy. In Japanese Unexamined Patent Publication No. 2005-300844, two line sensor arrays using a cross-type focus detection method are arranged adjacently in parallel to each other while being arranged so that the line sensors are relatively shifted (mutually deviated), whereby the pixel pitch can be reduced without reducing sensitivity; consequently, the focus detection accuracy is enhanced.

However, even if such related-art vertical line detection, horizontal line detection, and cross-type detection methods are performed, when an object has a contrast component (a luminance distribution) in an oblique direction, a focal shift still occurs. Japanese Examined Patent Publication No. H07-74855 and Japanese Unexamined Patent Publication No. 2005-300844 do not describe a focus detection method for dealing with an object that has a contrast component in an oblique direction, and there is no disclosure whatsoever of an oblique line detection method which detects a focus state of an object that has a contrast component in the oblique direction.

It is possible to implement an oblique line detection method by utilizing an output of a line sensor for vertical line detection or a line sensor for horizontal line detection. However, if the positions of object images formed on such (vertical or horizontal line detection) line sensors are deviated due to part accuracy or assembly error, focus detection is applied to different areas from those of the object images, and thus the focus detection accuracy is significantly and undesirably reduced. In order to suppress the reduction of the accuracy of such an oblique line detection method due to part accuracy, Japanese Unexamined Patent Publication No. H02-272410, for example, proposes an arrangement of line sensors that is determined in accordance with error in a separator lens thereof. However, a line sensor is required to be produced to correspond to the cavity of the separator lenses, which are resin molded, leading to an increase in cost. In Japanese Unexamined Patent Publication No. 2002-174766, the precision of the separator lens itself is increased to thereby enhance the precision of the oblique line detection. However, there are limits to the machining precision of the parts/components (i.e., part accuracy), and in addition, the influence of assembly error on an optical system which occurs when a line sensor is assembled cannot be corrected.

SUMMARY OF THE INVENTION

The present invention has been devised in view of the above described problems in conventional focus detection devices and provides a focus detection device which attains a low cost and a simple construction, reduces influence of part accuracy and assembly error, and can enhance the oblique line detection accuracy.

The present invention has been achieved by focusing on the fact that, by virtue of the use of a parallel line sensor having two line sensor arrays arranged adjacently parallel to each other, a contour of an object (edge angle of an object) can be discerned from a phase difference between output signals (output waveform) of the two adjacent line sensor arrays of the parallel line sensor; and by focusing on the fact that, by correcting a defocus amount according to the contour of the object (the edge angle of the object), or by selecting a line sensor pair for use in a defocus calculation, the influence of part accuracy and assembly error can be reduced, and oblique line detection accuracy can be enhanced.

According to an aspect of the present invention, a focus detection device, which detects a defocus amount based on a phase difference between a pair of object images that are obtained by pupil division and projected onto a pair of areas on a line sensor, is provided, including a parallel line sensor, constituting the line sensor, having two line sensor arrays arranged adjacently and in parallel to each other; and a correction calculator which corrects the defocus amount according to a phase difference between output signals of the two line sensor arrays of the parallel line sensor.

It is desirable for the correction calculator to correct the defocus amount based on error correction information, wherein the error correction information in which a focus detection error amount, which changes in accordance with the object image, corresponds to the phase difference between the output signals of the two line sensor arrays of the parallel line sensor.

It is desirable for the correction calculator to discriminate an edge angle of the object image from the phase difference between the output signals of the two line sensor arrays of the parallel line sensor and corrects the defocus amount according to the discriminated edge angle.

It is desirable for the focus detection error amount to be an error amount that changes in accordance with the edge angle of the object image.

It is desirable for the focus detection error amount to be detected via measurement.

In an embodiment, a focus detection device, which detects a defocus amount based on a phase difference between a pair of object images that are obtained by pupil division and projected onto a pair of focus detection areas on a line sensor, is provided, including a pair of horizontal parallel line sensors, each of which constitutes the line sensor, disposed in the horizontal direction for use in vertical line detection and a pair of vertical parallel line sensors, each of which constitutes the line sensor, disposed in the vertical direction for use in horizontal line detection, wherein each the parallel line sensor includes two line sensor arrays that are arranged adjacently in parallel to each other; a discriminator which discriminates an edge angle of the object image calculated from a phase difference between output signals of the two line sensor arrays of at least one the parallel line sensor; a selector, which selects a sensor output of one of the pair of horizontal parallel line sensors and the pair of vertical parallel line sensors, used in defocus calculation, according to the discriminated edge angle; and a calculator, which performs a defocus calculation based on the selected sensor output.

It is desirable for the one of the pair of horizontal parallel line sensors and the pair of vertical parallel line sensors, of which the sensor output is selected by the selector, to have a smaller focal-shift amount in the edge angle discriminated by the discriminator than that of the other of the pair of horizontal parallel line sensors and the pair of vertical parallel line sensors.

It is desirable for the selector to select both the pair of horizontal parallel line sensors and the pair of vertical parallel line sensors at the edge angle when respective focal-shift amounts thereof fall within a predetermined value, and for the calculator to calculate an average value of a result of defocus calculation using the output of the pair of horizontal parallel line sensors and the result of defocus calculation using the output of the pair of vertical parallel line sensors, wherein the average value is obtained as a defocus amount.

According to the present invention, the parallel line sensor having two line sensor arrays arranged adjacently parallel to each other is used as a line sensor, and a defocus amount is corrected according to the phase difference between the output signals of the two adjacent line sensor arrays of the parallel line sensor, or the output of a line sensor pair is selected to be used in a defocus calculation. Therefore, even if the part accuracy of the optical components of the line sensor is low and assembly error occurs, such adverse influence can be eliminated; and a focus detection device which can be provided at low cost, has a simple construction and can enhance oblique line detection accuracy, is achieved.

The present disclosure relates to subject matter contained in Japanese Patent Application Nos. 2009-165977 (filed on Jul. 14, 2009) and 2010-153833 (filed on Jul. 6, 2010) which are expressly incorporated herein by reference in their entireties.

BRIEF DESCRIPTION OF THE DRAWINGS

The present invention will be described below in detail with reference to the accompanying drawings in which.

DESCRIPTION OF THE PREFERRED EMBODIMENT

Figure 1:
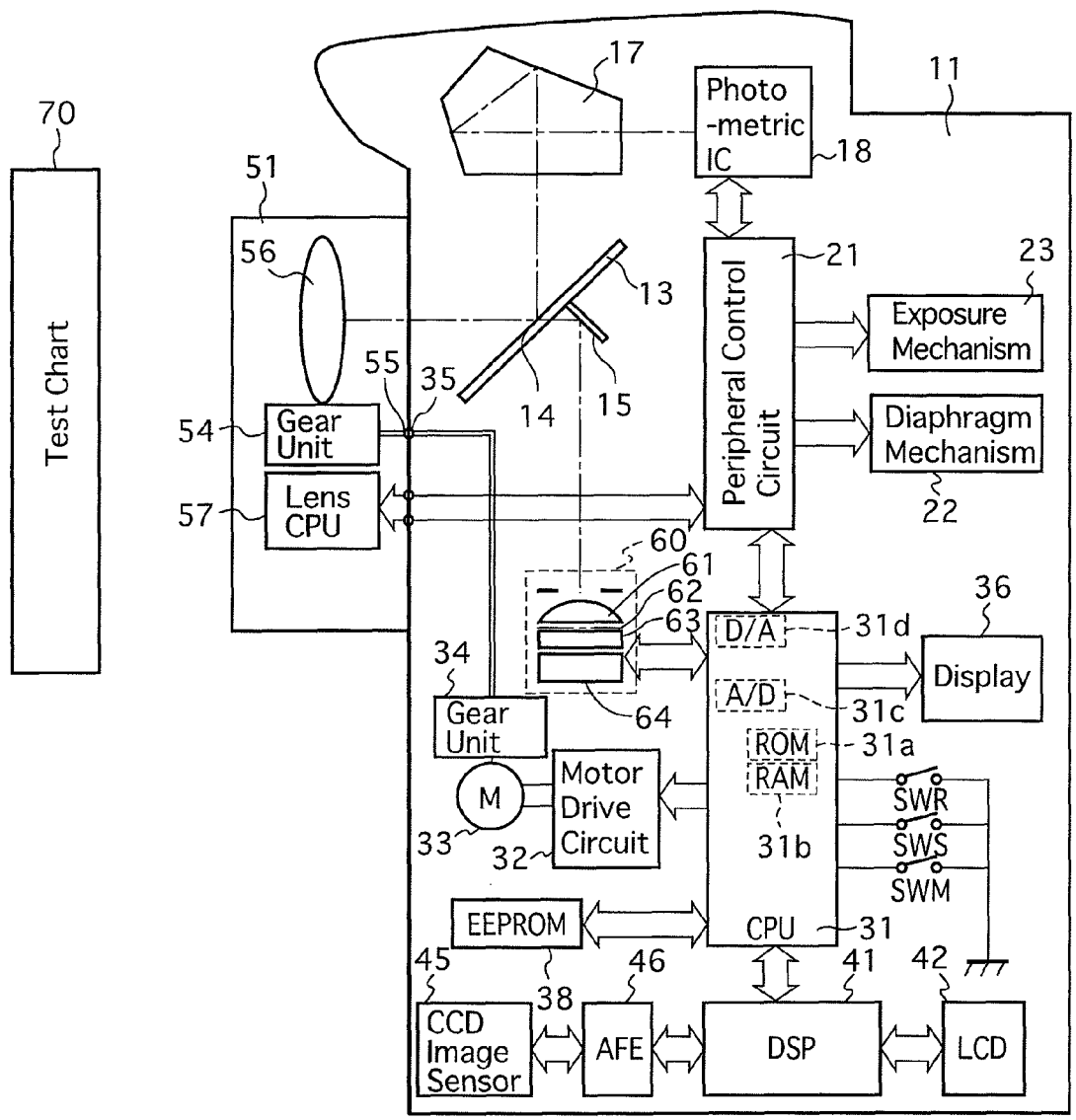
FIG. 1 is a schematic block diagram showing a single-lens reflex camera equipped with a focus detection device according to the present invention.

FIG. 1 shows a block diagram of the main components of an AF single-lens reflex camera to which an embodiment of the present invention is applied. The AF single-lens reflex camera includes a camera body 11 having incorporated therein an AF module (focus detection module) 60 as a focus detection device and an AF photographing lens 51, which is detachably attached to the camera body 11.

The camera body 11 includes a body CPU 31 which generally controls the camera body 11 and the photographing lens 51, and which functions also as a discriminator, a selector, a correction calculator, and a calculator. The photographing lens 51 is provided with a lens CPU 57 which controls the lens functions. The camera body 11 includes a peripheral control circuit 21 which transmits and receives lens data and AF lens driving data, etc., to and from the lens CPU 57 provided in the photographing lens 51.

A large part of an incident object-emanating light bundle that enters inside the camera body 11 via the photographing lens 51 is reflected by a main mirror 13 toward a pentagonal prism 17, which constitutes a finder optical system, is reflected by the pentagonal prism 17 and is emitted from an eyepiece (not shown). Part of the object-emanating light emitted from the pentagonal prism 17 is incident upon a light receiving element of a photometering IC 18. The light bundle incident upon a half mirror 14 formed at the central portion of the main mirror 13 is transmitted through the half mirror 14 and is reflected downward toward the AF module 60 via a sub-mirror 15 provided on the rear surface of the main mirror 13.

The photometering IC 18 converts the received light into electric signals corresponding to the quantity of received light and outputs the electric signals, as brightness signals, to the body CPU 31 via the peripheral control circuit 21. The body CPU 31 performs an exposure calculation, based on the brightness signal and the film sensitivity data, etc., and calculates an appropriate shutter speed and a diaphragm value for exposure. Upon a photographing operation being performed, the peripheral control circuit 21 drives the diaphragm mechanism 22 to thereby set the diaphragm (not shown) of the photographing lens 51 to the calculated diaphragm value, in accordance with the shutter speed and the diaphragm value obtained by the above-mentioned calculation. Consequently, the exposure mechanism (focal plane shutter) 23 is driven based on the calculated shutter speed to perform the exposure operation.

The AF module 60 detects the focal state of an object and outputs a video signal, as pixel units to the body CPU 31. The body CPU 31 performs defocus calculation based on the input signal from the AF module 60 and drives an AF motor 33 by the calculated defocus amount by a motor drive circuit 32. The rotation of the AF motor 33 is reduced by a gear unit 34 and is transmitted to a focus adjustment optical system 56 of the photographing lens 51 via the connection between a joint 35 provided on the body mount of the camera body 11, a lens joint 55 provided on the lens mount of the photographing lens 51, and a gear unit 54 that is provided in the photographing lens 51.

The body CPU 31 includes a ROM 31a in which control programs, etc., are stored, a RAM 31b in which data for calculation and control is temporarily stored, an A/D converter 31c, and a D/A convertor 31d.

A main switch SWM for controlling the power supply to the peripheral control circuit 21, a photometering switch SWS which is turned ON when a manual release button is depressed halfway, and a release switch SWR which is turned ON when the manual release button is fully depressed, are provided in the body CPU 31.

Furthermore, the body CPU 31 is connected to a display panel 36 which displays various photographing information including information on an AF mode, an exposure mode, a photographing mode, shutter speed, and f-number; and an EEPROM 38 which is an external nonvolatile memory. The display panel 36 includes indicators (not shown) which are usually provided on the outer surface of the camera body 11 and/or in the finder field-of-view. The EEPROM 38 stores therein various constants inherent to the camera body 11.

The camera body 11 is provided with a CCD image sensor (image pickup device) 45. A focus detection surface of the AF module 60 is set optically equivalent to an imaging surface of the CCD image sensor 45. The output signal of the CCD image sensor 45 is digitized by an AFE (analog front end) 46, and a DSP 41 subsequently processes the digitized output signal into a video signal that is capable of being displayed on an LCD 42. The DSP 41 exchanges various photographing information with the body CPU 31.

Figure 2:
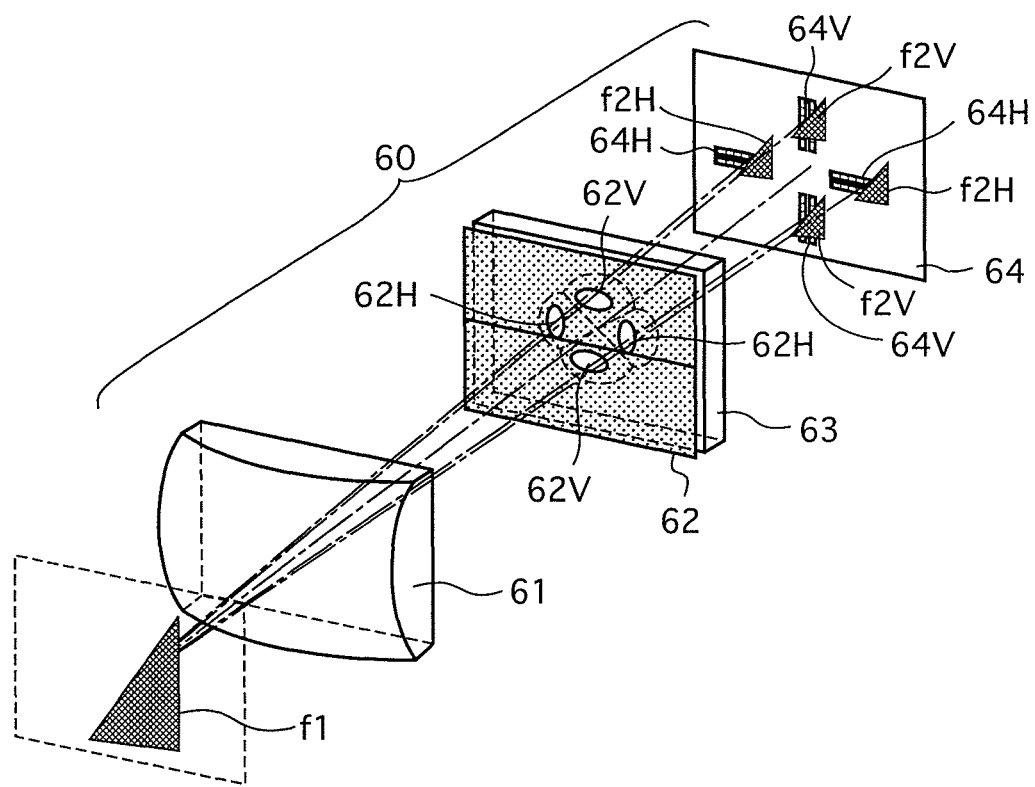
FIG. 2 is an exploded perspective view showing elements of an AF module.

FIG. 2 is an exploded perspective view showing elements of the AF module 60. The AF module 60 uses a so-called pupil division phase-difference method for focus detection, and includes a condenser lens 61, a separator mask 62, a separator lens 63, and a CCD focus detection element 64. The condenser lens 61 is disposed more rearward than a focal plane (primary imaging surface) at which an object image (primary image) f1 is to be formed through the photographing lens 51. The separator mask 62 and the separator lens 63 pupil-divide the object-emanating light bundle that is collected by the condenser lens 61. The CCD focus detection element 64 includes line sensor pairs 64V and 64H, and two pairs of object images (secondary images) f2V and f2H obtained via pupil-division are projected respectively onto the line sensor pairs 64V and 64H. The separator mask 62 is disposed on the incident side of the separator lens 63 and has two pairs of transmission holes 62V and 62H for transmitting the object-emanating light bundles. The transmission holes 62V and 62H are provided respectively in the vertical direction and the horizontal direction of the separator mask 62. The separator lens 63 is constituted of integrally molded lenses.

The CCD focus detection element 64 is provided with a plurality of line sensors which receive and integrate the pair of pupil-divided object-emanating light bundles. The four line sensors (64V and 64H) are include a pair of horizontal line sensors 64H which are disposed in the horizontal direction and are used for vertical line detection, and a pair of vertical line sensors 64V which are disposed in the vertical direction and are used for horizontal line detection. Each line sensor of the pair of horizontal line sensors 64H and the pair of vertical line sensors 64V is a parallel line sensor (see FIGS. 4A and 4B) having two line sensor arrays a and b arranged adjacently parallel with each other and define an interval d therebetween. Alternatively, providing that the two line sensor arrays a and b are adjacent to each other, the two line sensor arrays a and b may be arranged in a zigzag pattern, or may be arbitrary two line sensor arrays of an area sensor arranged sensor line; in either case, the operation thereof does not change.

Although not illustrated in the drawings, the CCD focus detection element 64 includes four monitor sensors (having a similar arrangement to that of the line sensors 64V and 64H), each of which checks the quantity of light received (a integrated value) by a portion of the associated line sensor, and a control circuit system, which drives and controls each line sensor and the monitor sensor. When the monitored voltage (output voltage) of one monitor sensor reaches a predetermined AGC level, the control circuit system stops the integral operation of the line sensor that corresponds to that monitor sensor. When the integral operations of all line sensors are completed, the charges obtained by the integral operations are successively converted into a voltage per pixel unit for each line sensor and are output as video signals per pixel unit to the body CPU 31.

Figure 3A:
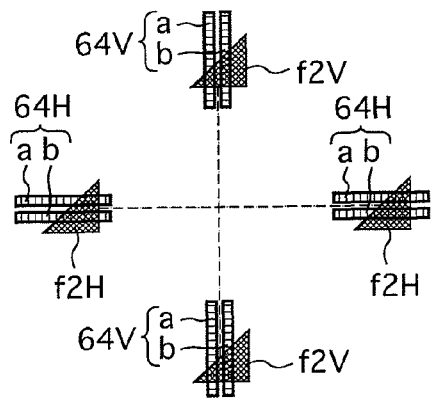
FIGS. 3A through 3C are schematic plan views showing an object image projected onto a CCD focus detection element, FIG. 3A showing a case where pairs of vertical and horizontal line sensors have no assembly error, FIG. 3B showing a case where the pair of vertical line sensors has an assembly error, and FIG. 3C showing a case where the pairs of vertical and horizontal line sensors have an assembly error.
Figure 3B:
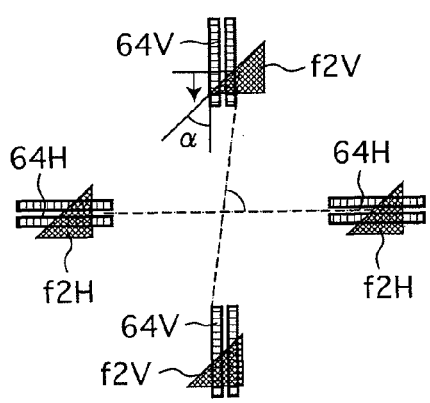
Figure 3C:
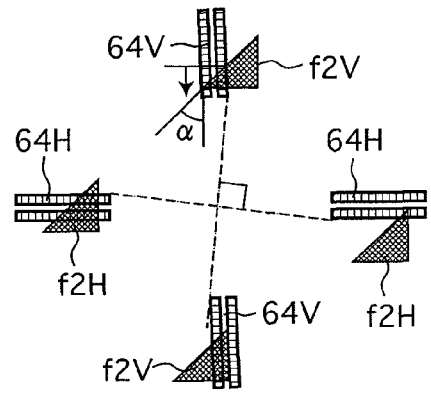

FIGS. 3A through 3C are schematic plan views showing two pairs of object images f2V and f2H projected on the pair of horizontal line sensors 64H and the pair of vertical line sensors 64V of the CCD focus detection element 64.

FIG. 3A shows a case where the separator lens 63 has favorable part accuracy, and the pair of horizontal line sensors 64H and the pair of vertical line sensors 64V have no assembly error. In this case, the same areas of the object images f2H and f2V are projected on the pair of horizontal line sensors 64H and the pair of vertical line sensors 64V.

FIG. 3B shows the case in which, although the pair of horizontal line sensors 64H and pair of vertical line sensors 64V have no assembly error, the part accuracy of the separator lens 63 relative to the pair of vertical line sensors 64V is low, or although the part accuracy of the separator lens 63 is favorable and the pair of horizontal line sensors 64H has no assembly error, the pair of vertical line sensors 64V has an assembly error. In this case, while the same portions of the pair of object images f2H are projected on the pair of horizontal line sensors 64H, different portions of the pair of object images f2V are projected on the pair of vertical line sensors 64V. If the CCD focus detection element 64 performs focus detection in such a state, the pair of vertical line sensors 64V performs focus detection on different portions of the pair of object images f2V, whereby the focus detection accuracy is significantly reduced. Therefore, an error in the negative direction (the direction in which the interval of the object images is reduced) occurs in the pair of object images f2V projected on the pair of vertical line sensors 64V, and when focusing is performed based on the output of the pair of vertical line sensors 64V, a rear focus occurs.

FIG. 3C shows a case in which, although the part accuracy of the separator lens 63 is favorable, the pair of horizontal line sensors 64H and the pair of vertical line sensors 64V have an assembly error. In such a case, an error in the positive direction (the direction in which the interval of the object images is increased) occurs in the pair of object images f2H projected on the pair of horizontal line sensors 64H, and the error in the negative direction (the direction in which the interval of the object images is reduced) occurs in the pair of object images f2V projected on the pair of vertical line sensors 64V. Thus, when focusing is performed based on the output of the pair of horizontal line sensors 64H, a front focus occurs, and when focusing is performed based on the output of the pair of vertical line sensors 64V, the rear focus occurs.

Figure 4A:
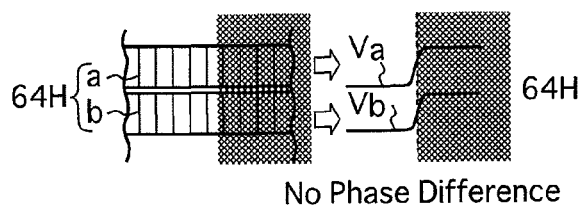
FIGS. 4A and 4B are schematic views showing output signals of two adjacent line sensor arrays of a parallel line sensor, FIG. 4A showing a case where an object has a vertical edge, and FIG. 4B showing a case where the object has an oblique edge.
Figure 4B:
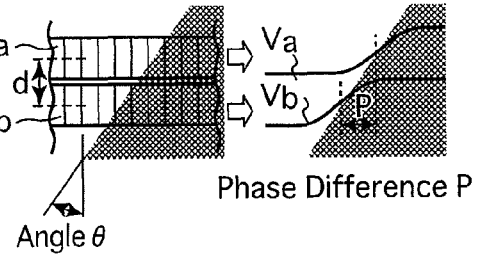

FIGS. 4A and 4B are schematic plan views showing a relationship between an object image projected on the two line sensor arrays a and b, constituting the pair of horizontal line sensors 64H, and output signals (output waveforms) Va and Vb of the line sensor arrays a and b. In FIGS. 4A and 4B, the object image projected on the line sensor arrays a and b is shown by shaded areas.

When an object has a contrast component (a luminance distribution) in the vertical direction, the contour (edge) of the object is projected at the same positions in the horizontal direction in the two line sensor arrays a and b arranged vertically, as shown in FIG. 4A. Therefore, the output signals Va and Vb from the two line sensor arrays a and b are the same, and thus a phase difference p does not occur.

Whereas, when the object has a contrast component (the luminance distribution) in the oblique direction, the contour (edge) of the object image is projected at different positions in the horizontal direction in the two line sensor arrays a and b arranged vertically, as shown in FIG. 4B. Therefore, the phase difference p occurs between the output signals Va and Vb from the two line sensor arrays a and b. The phase difference p of the line sensor arrays a and b is changed by an edge angle $\theta$ of the object image independently of the part accuracy of the separator lens 63 and the sensor assembly error.

The edge angle $\theta$ of the object image (as shown in FIG. 4B, the angle measured in a clockwise direction relative to the direction orthogonal to the arrangement direction of the two line sensor arrays a and b) [deg] can be calculated by tan $\theta$=p/d in the pair of horizontal line sensors 64H and can be calculated by tan($\theta$−90°)=p/d in the pair of vertical line sensors 64V, wherein the interval defined between the two line sensor arrays a and b is d, and the phase difference between the output signals Va and Vb of the two line sensor arrays a and b is p. The phase difference p is calculated by p=Vb−Va. In the example of FIG. 4B, p is a positive value. Since the pair of vertical line sensors 64V is a sensor located at a position rotated by 90° counterclockwise from the pair of horizontal line sensors 64H, tan($\theta$−90°) is used. In FIGS. 4A and 4B, for the sake of convenience of explanation, a single edge exists in a phase-difference detection area of the two line sensor arrays a and b of the parallel line sensor (64H) that detects the phase difference. In practice, in accordance with photographic conditions, a plurality of edges having different angles may be included within the phase-difference detection area of the two line sensor arrays a and b of the parallel line sensor (64H). In such a case, the edge angle $\theta$, calculated from the phase difference p between the output signals Va and Vb of the two line sensor arrays a and b of the parallel line sensor, is an average value of the plurality of edges having different angles, and does not necessarily correspond to a single edge angle of an object image. When a plurality of edges are included within the phase-difference detection area, strictly speaking, the edge angle $\theta$ is a numerical value representing the degree of influence of the edge angle of the object image. Whereas, the relationship between the phase difference p between the output signals Va and Vb of the two line sensor arrays a and b of the parallel line sensor and a focus detection error amount is approximately coincident when the edge angle $\theta$ is a value of a single edge or when the edge angle $\theta$ is an average value of a plurality of edges. Since the relationship between the phase difference p and the edge angle $\theta$ is uniquely determined independently of the number of detected edges, a description of the case where a plurality of edges are included within the phase-difference detection area is omitted in the present specification.

Figure 5:
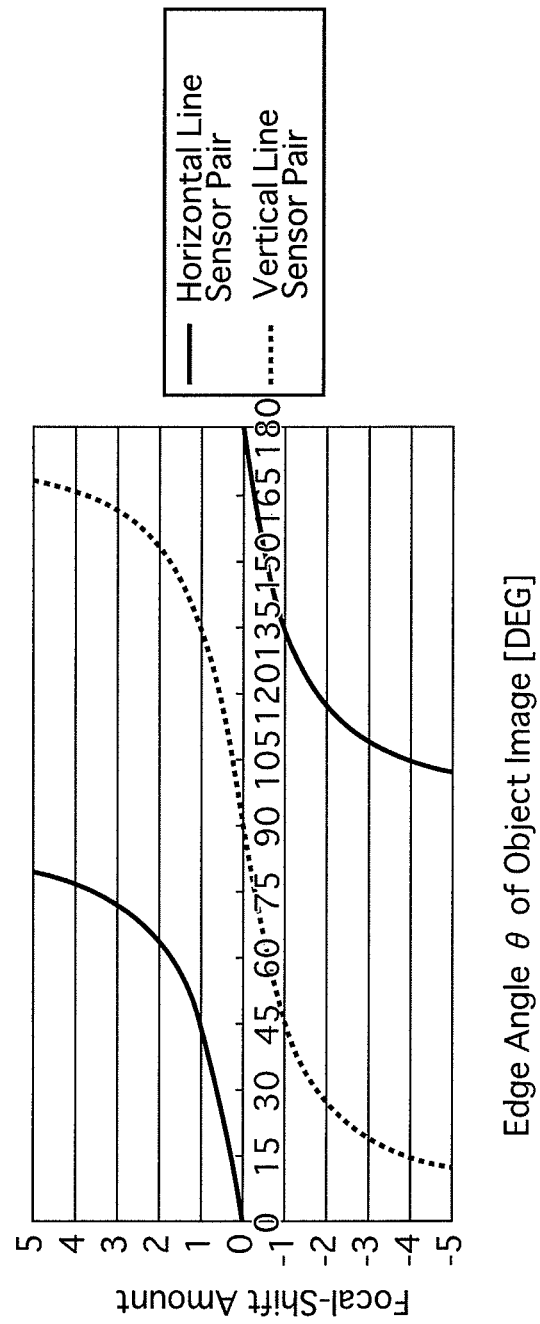
FIG. 5 is a graph showing a relationship between an edge angle of the object image and a focal-shift amount of the line sensor.

FIG. 5 is a graph showing the relationship between the edge angle $\theta$ of an object image and focal-shift amount (focus detection error) of the pair of horizontal line sensors 64H and the pair of vertical line sensors 64V. A deviation of the object image (focal shift) with respect to the arrangement direction of the two line sensor arrays a and b of each line sensor is changed by part accuracy error of the separator lens 63 and/or sensor assembly error. Therefore, in the graph of FIG. 5, the focal-shift amount that is generated when the edge angle $\theta$ of the object image of the pair of horizontal line sensors 64H is 0° and the edge angle $\theta$ of the object image of the pair of vertical line sensors 64V is 180° is normalized to "0", and when the focal-shift amount that is generated when the edge angle $\theta$ of the object image of the pair of horizontal line sensors 64H is 45° and the edge angle $\theta$ of the object image of the pair of vertical line sensors 64V is 135° is normalized to "1". The solid line of FIG. 5 shows the focal-shift amount of the pair of horizontal line sensors 64H, and the dashed line shows the focal-shift amount of the pair of vertical line sensors 64V. The phase of the edge angles $\theta$ of the object images is shifted by 90° with respect to the pair of horizontal line sensors 64H and the pair of vertical line sensors 64V.

In the present embodiment, the relationship between the edge angle $\theta$ of the object image and the focal-shift amounts of the pair of horizontal line sensors 64H and the pair of vertical line sensors 64V shown in FIG. 5 is used, and the output of the line sensor pair used in defocus calculation is corrected or selected according to the edge angle $\theta$ of the object image, whereby the focus detection accuracy is enhanced for an object having a contrast component (luminance distribution) in the oblique direction.

A first embodiment will be described herein with reference to FIGS. 6 through 8. In the first embodiment, the output of the line sensor pair used in the defocus calculation is corrected according to the edge angle $\theta$ of the object image. The flow charts of FIGS. 6 through 8 are executed by the body CPU 31.

Figure 6:
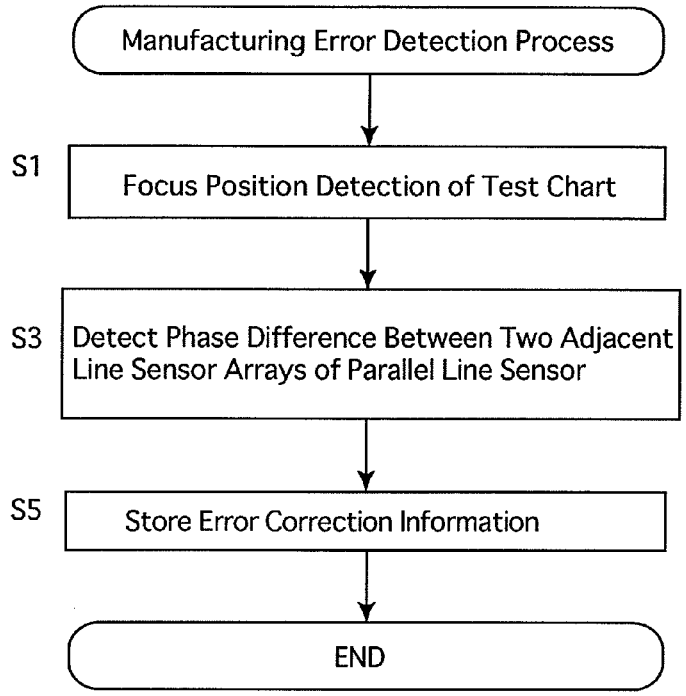
FIG. 6 is a flow chart of a manufacturing error detection process, performed at a manufacturing stage in a first embodiment, that detects a focus detection error due to part accuracy of a separator lens and assembly error of the pairs of vertical and horizontal line sensors.

FIG. 6 is a flow chart of a manufacturing error detection process that detects a focus detection error due to part accuracy of the separator lens 63 and/or assembly error of the pair of horizontal line sensors 64H and pair of vertical line sensors 64V. This manufacturing error detection process is performed at a manufacturing stage. The body CPU 31 first performs a focus detection of a test chart 70, previously set up at a predetermined distance, using the AF module 60 (step S1). The body CPU 31 then measures the phase difference p between the output signals Va and Vb of the two adjacent line sensor arrays a and b of a parallel line sensor (64V or 64H) at a chart angle $\alpha$ (see, FIGS. 3B and 3C) (step S3) to store error correction information at the chart angle $\alpha$ in the EEPROM 38 (step S5). The test chart 70 is set at an initial orientation so that the edge angle $\theta$ of the object image calculated from the phase difference of the parallel line sensor is 0°, i.e., the test chart 70 is set so that the chart angle $\alpha$ thereof is 0°. Although the parallel line sensor subjected to the phase difference measurement in step S3 may be any parallel line sensor constituting the pair of horizontal line sensors 64H and pair of vertical line sensors 64V, the parallel line sensor is the same as that used in the calculation of the edge angle θ in step S27 to be described later.

Figure 7:
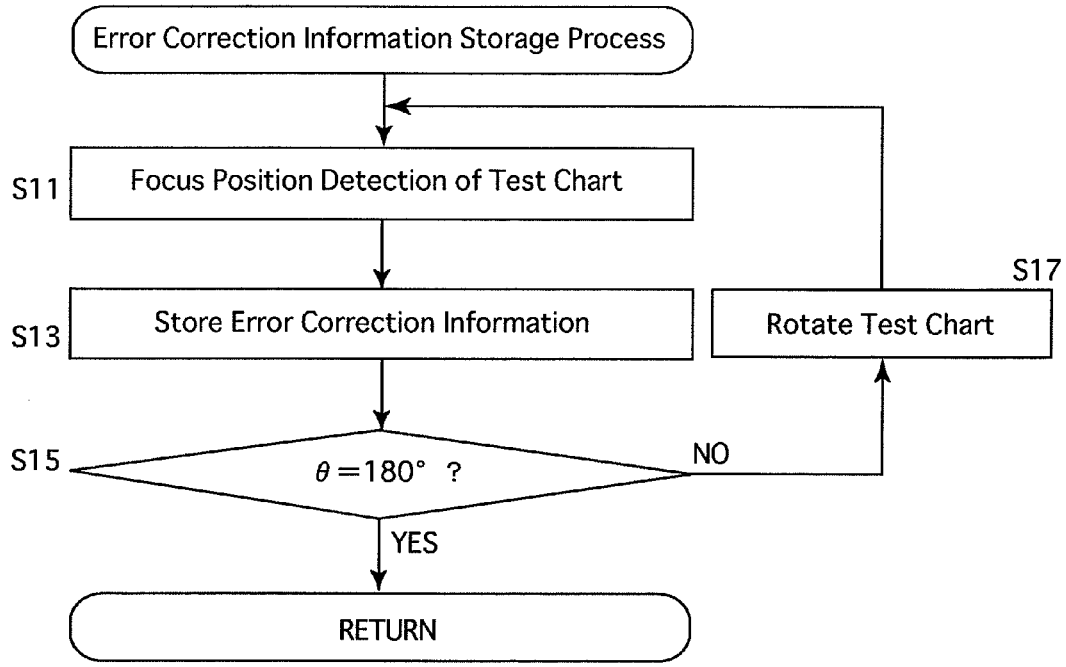
FIG. 7 is a flow chart showing an example of a storage process of error correction information executed in S5 of FIG. 6.
Figure 8:
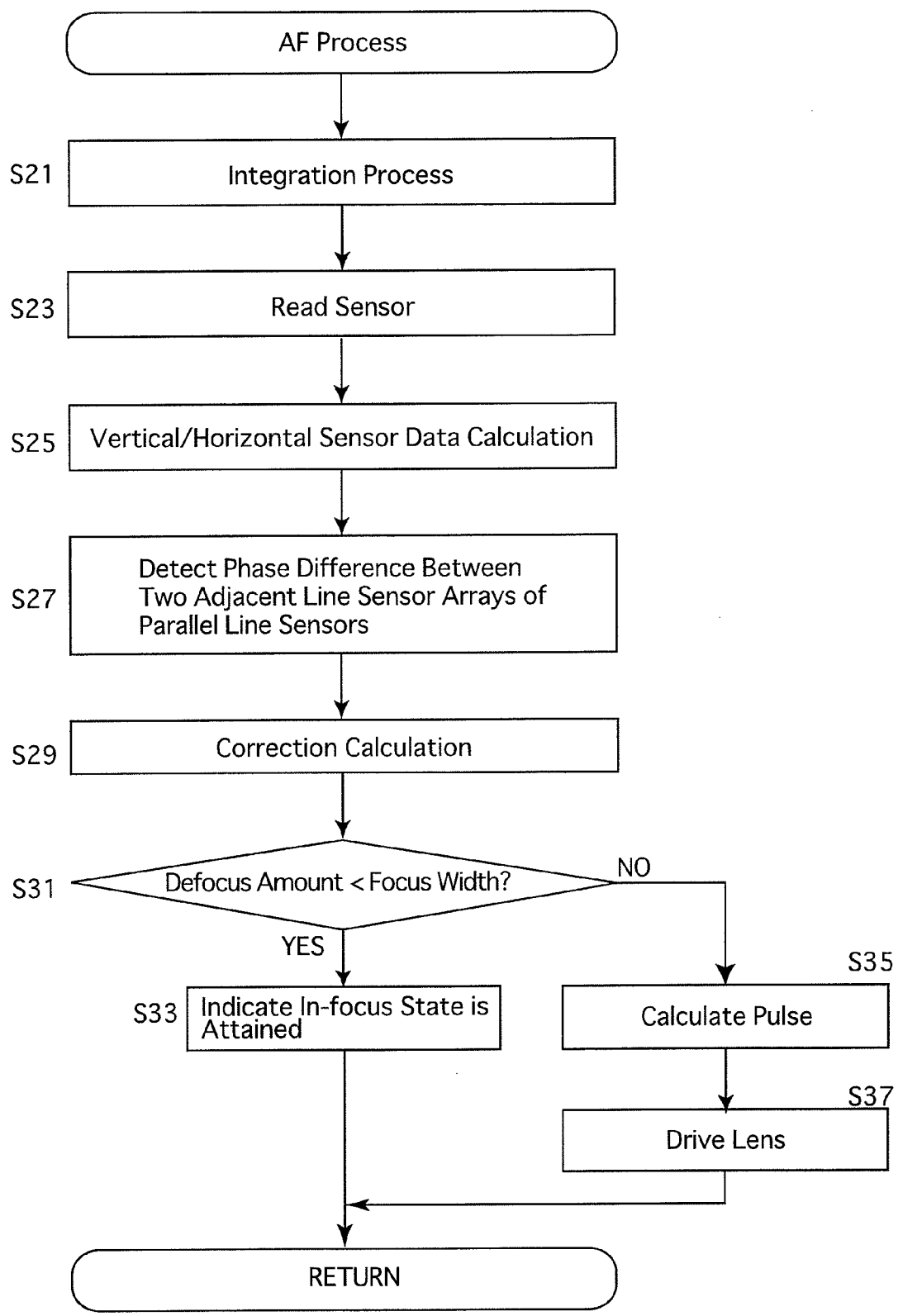
FIG. 8 is a flow chart showing an example of an AF process in the first embodiment.

FIG. 7 is a flow chart showing an example of the storage process of the error correction information executed in step S5 of FIG. 6. In the storage process, the test chart 70 is set at an orientation so that the edge angle θ of the object image=0° is subjected to a focus detection operation by the AF module 60 (step S11). Thereafter, error correction information, in which the edge angle θ of the object image and the focal-shift amounts of the pair of horizontal line sensors 64H and pair of vertical line sensors 64V are correlated, is stored in the EEPROM 38 (step S13). Subsequently, it is checked whether or not the edge angle θ of the object image is 180° (S15). If the edge angle θ of the object image is not 180°, the test chart 70 is rotated in a direction to increase the edge angle θ of the object image by a rotational amount of 1° (step S15: NO and step S17), and control returns to step S11. If the edge angle θ of the object image has reached 180°, control returns (step S15: YES). The process from steps S11 to S17 is repeated until the edge angle θ of the object image has reached 180°, whereby the error correction information corresponding to the edge angle θ of the object image (0°=θ=≦180°: θ is a positive integer) is obtained.

The AF process will be explained below with reference to the flow chart shown in FIG. 8. The body CPU 31 first starts an integration process of each line sensor of the pair of horizontal line sensors 64H and the pair of vertical line sensors 64V of the CCD focus detection element 64 (step S21). Upon either the monitor voltage of any monitor sensor reaching a predetermined AGC level or after a lapse of a predetermined time, whichever occurs the soonest, the accumulated electric charge of each line sensor of the pair of horizontal line sensors 64H and the pair of vertical line sensors 64V is read out in sequence as a video signal per pixel unit (step S23). Thereafter, a defocus calculation is performed using the output of at least one of the read pair of horizontal line sensors 64H and pair of vertical line sensors 64V (S25).

Subsequently, the edge angle θ of the object image projected onto the parallel line sensor (64V or 64H) that was read in step S23 is calculated from the phase difference p of the output signals Va and Vb of the adjacent two line sensor arrays of the parallel line sensor (step S27). The edge angle θ is calculated by tan θ=p/d, wherein d is an interval defined between the two line sensor arrays a and b of the read parallel line sensor (64V or 64H). Although the parallel line sensor used in the calculation of the edge angle in step S27 may be any parallel line sensor constituting the pair of horizontal line sensors 64H and the pair of vertical line sensors 64V, the parallel line sensor is the same as that used in the phase difference measurement in step S3. In the present embodiment, one parallel line sensor of the pair of horizontal line sensors 64H is used.

Subsequently, the defocus amount calculated in step S25 is corrected using the error correction information corresponding to the calculated edge angle θ of the object image (step S29). As described above, since the error correction information is stored in the EEPROM 38 at the manufacturing stage (FIGS. 6 and 7), the error correction information corresponding to the calculated edge angle θ is read from the EEPROM 38 and used in step S29. In the present embodiment, the phase difference p between the output signals Va and Vb of the adjacent two line sensor arrays a and b of the parallel line sensor is converted to a numerical value θ showing the edge angle of the object image (or the degree of the influence of the edge angle) to be associated with the error correction information; however, the error correction information directly associated with the phase difference p between the output signals Va and Vb of the adjacent two line sensor arrays a and b of the parallel line sensor is created, and defocus correction may be performed using the error correction information.

Thereafter, it is checked whether or not the corrected defocus amount is smaller than a predetermined focus width (step S31). If the defocus amount is smaller than the predetermined focus width, information indicating that an in-focus state is attained is displayed on the display panel 36 (step S31: YES, step S33). If the defocus amount is not less than the predetermined focus width, the number of pulses corresponding to the defocus amount is calculated (step S31: NO, step S35). The AF motor 33 is driven by the motor drive circuit 32 to move the focus adjustment optical system 56 until the calculated pulse number is reached (step S37).

In the first embodiment, the pair of horizontal line sensors 64H and the pair of vertical line sensors 64V are both provided in the CCD focus detection element 64. However, in the first embodiment, the pair of horizontal line sensors 64H and the pair of vertical line sensors 64V do not necessarily need to be both provided, it is possible for only one pair of line sensors (i.e., either the pair of horizontal line sensors 64H or the pair of vertical line sensors 64V) to be provided.

A second embodiment will be described with reference to FIGS. 9 through 11. In the second embodiment, the output of the pair of parallel line sensors to be used in the defocus calculation is selected according to the edge angle θ of the object image. The flow charts of FIGS. 9 through 11 are executed by the body CPU 31.

Figure 9:
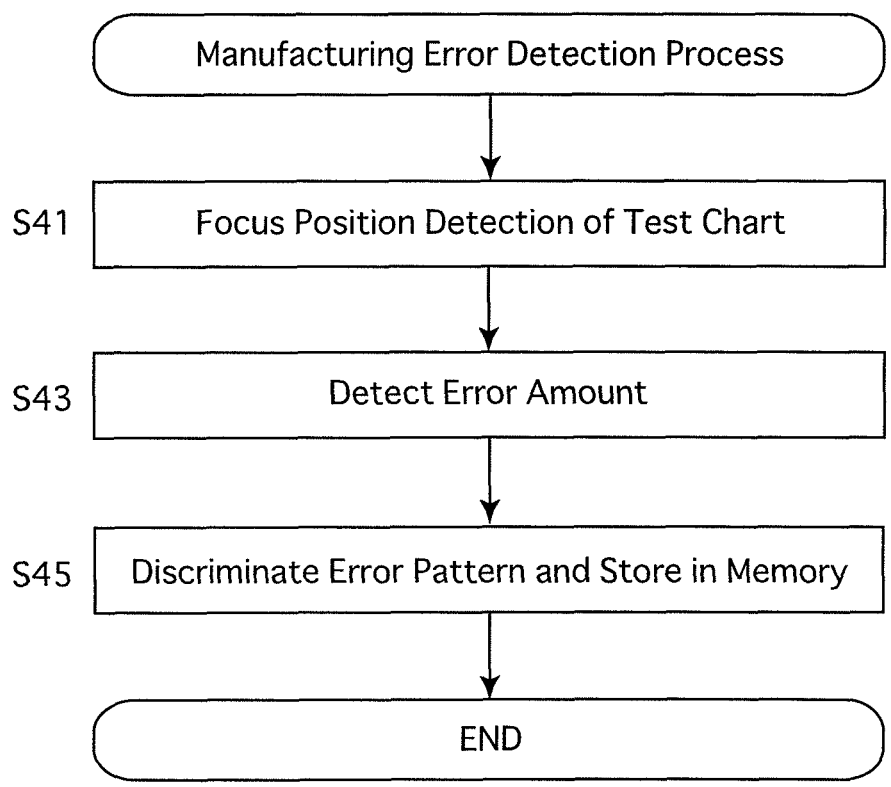
FIG. 9 is a flow chart of a manufacturing error detection process, performed at a manufacturing state in a second embodiment, that detects a focus detection error of the separator lens and the assembly error of the pairs of vertical and horizontal line sensors.

FIG. 9 is a flow chart of a manufacturing error detection process that detects a focus detection error due to part accuracy of the separator lens 63 and/or assembly error of the pair of horizontal line sensors 64H and pair of vertical line sensors 64V. This manufacturing error detection process is performed at a manufacturing stage. The body CPU 31 performs a focus detection of the test chart 70, previously set up at a predetermined distance, using the AF module 60 (step S41) to detect the amount of error due to the assembly of the pair of horizontal line sensors 64H and the pair of vertical line sensors 64V (step S43), and a control program to be executed according to the error amount (S45) is set accordingly. In the present embodiment, the control program is set so that the AF process shown in FIG. 10 is executed when only the pair of vertical line sensors 64V has an assembly error, and the AF process shown in FIG. 11 is executed when the pair of horizontal line sensors 64H and the pair of vertical line sensors 64V both have an assembly error.

Figure 10:
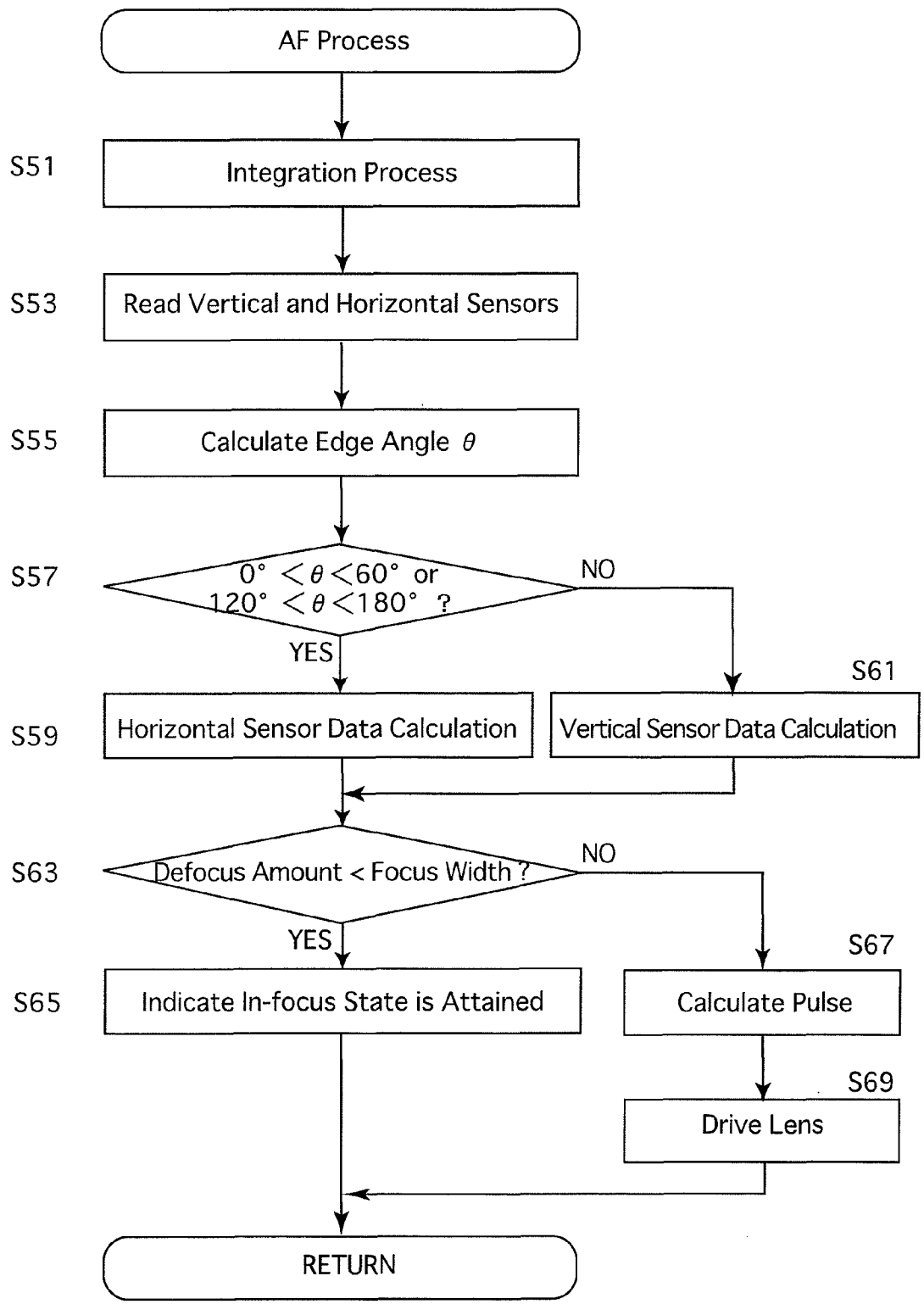
FIG. 10 is a flow chart showing an example of the AF process performed in a case where the pair of vertical line sensors has an assembly error in the second embodiment.
Figure 11:
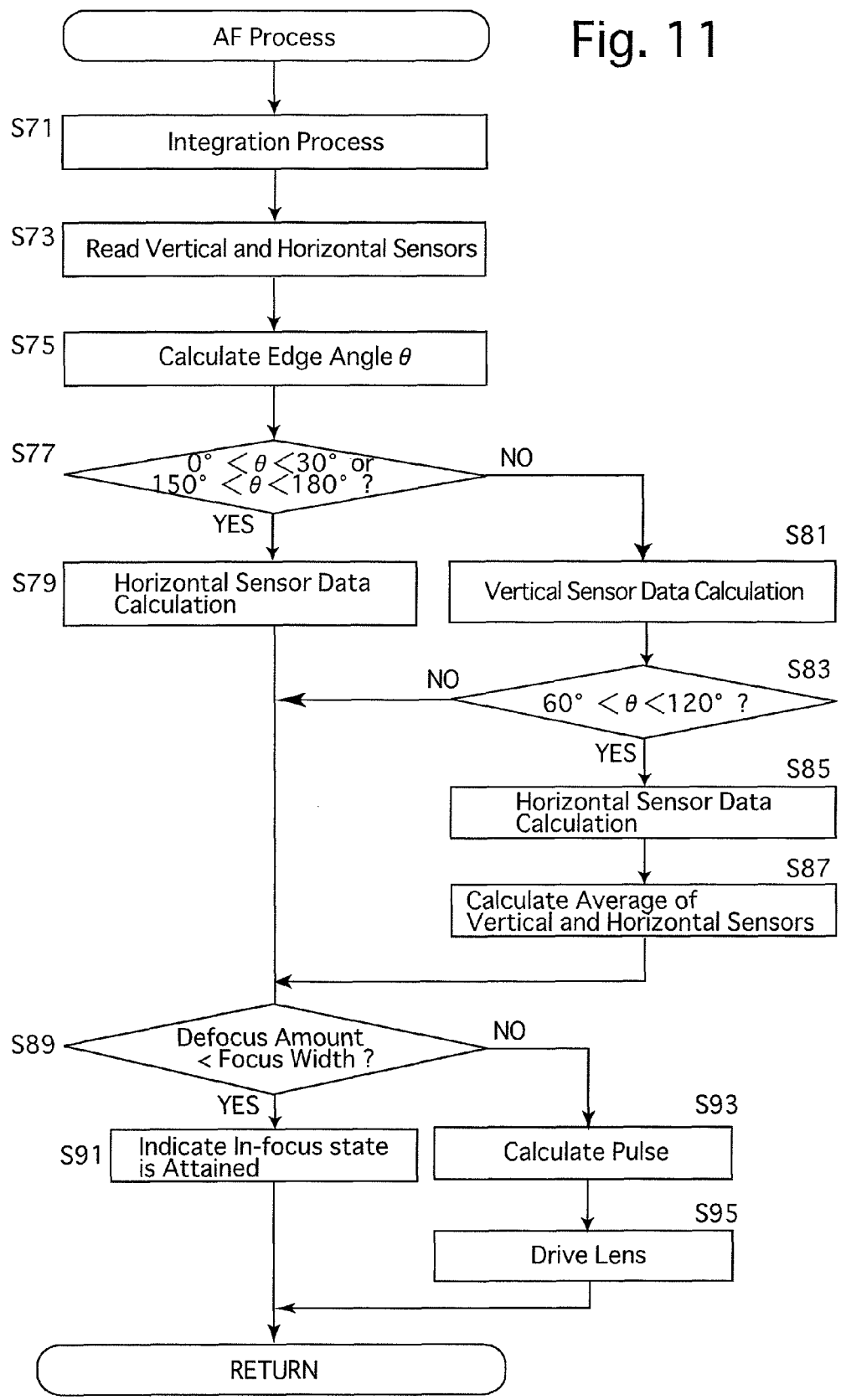
FIG. 11 is a flow chart showing an example of the AF process performed in a case where the pairs of vertical and horizontal line sensors have an assembly error in the second embodiment.

FIG. 10 is a flow chart showing an example of the AF process performed in a case where, although the pair of horizontal line sensors 64H have no assembly error, the pair of vertical line sensors 64V has an assembly error, i.e., a case where, as shown in FIG. 3B, the same portions of the pair of object images f2H are projected on the pair of horizontal line sensors 64H, and different portions of the pair of object images f2V are projected on the pair of vertical line sensors 64V.

The body CPU 31 first starts integrating each line sensor of the pair of horizontal line sensors 64H and the pair of vertical line sensors 64V of the CCD focus detection element 64 (step S51). Upon either the monitor voltage of any monitor sensor reaching a predetermined AGC level or after a lapse of a predetermined time, whichever occurs the soonest, the accumulated electric charge of each line sensor of the pair of horizontal line sensors 64H and the pair of vertical line sensors 64V is read out in sequence as a video signal per pixel units (step S53). Thereafter, the edge angle θ of the object image projected on the pair of horizontal line sensors 64H is calculated from the phase difference p between the output signals Va and Vb of the two adjacent line sensor arrays a and b of the read parallel line sensor (step S55). The edge angle θ is calculated by tan θ=p/d. In the present embodiment, one parallel line sensor of the pair of horizontal line sensors 64H is used in the calculation of the edge angle θ, and the output of the pair of horizontal line sensors 64H and pair of vertical line sensors 64V are read simultaneously. However, in order to speed up the process, the output of the pair of horizontal line sensors 64H is read in step S13, and the output of the pair of vertical line sensors 64V may be read later on in step S23.

Subsequently, it is checked whether or not the calculated edge angle θ is within the range of 0°<θ<60° or 120°<θ<180° (step S57). If the edge angle θ is within the range of 0°<θ<60° or 120°<θ<180°, the defocus calculation is performed using the output of the pair of horizontal line sensors 64H (step S57: YES, step S59). If the edge angle θ is out of the range of 0°<θ<60° or 120°<θ<180°, the defocus calculation is performed using the output of the pair of vertical line sensors 64V (step S57: NO, step S61).

When the calculated edge angle θ is within the range of 0°<θ<60° or 120°<θ<180°, the focal-shift amount of the pair of horizontal line sensors 64H in which assembly error has not occurred does not change, as shown by the solid line of FIG. 5, or the change is negligible; therefore, favorable focus detection accuracy is maintained by using the output of the pair of horizontal line sensors 64H in the defocus calculation. However, if the edge angle θ is 60°=θ=120°, rise or fall of the output signal of the pair of horizontal line sensors 64H is drastically reduced, and thus the focus detection accuracy is reduced. In addition, the detection accuracy of the phase difference p is also reduced, and therefore, even if the projected object image is shifted in the arrangement direction of the two line sensor arrays a and b, when the output of the pair of vertical line sensors 64V of which focal-shift amount shown by the dashed line of FIG. 5 falls within ±0.5° is used in the defocus calculation, the focus detection accuracy can be more enhanced. The specific numerical value of the edge angle θ (threshold value) by which the pair of horizontal line sensors 64H and pair of vertical line sensors 64V are switched may be changed by a range within approximately ±10° in accordance with the degree of assembly error that occurs due to, e.g., individual differences between different AF modules 60.

After the defocus calculation, it is checked whether or not the calculated defocus amount is smaller than a predetermined focus width (step S63). If the defocus amount is smaller than the predetermined focus width, information indicating that an in-focus state is attained is displayed on the display panel 36 (step S63: YES, step S65). If the defocus amount is not less than the predetermined focus width, the number of pulses corresponding to the defocus amount is calculated (step S63: NO, step S67). The AF motor 33 is driven by the motor drive circuit 32 to move the focus adjustment optical system 56 until the calculated pulse number is reached (step S69).

FIG. 11 is a flow chart showing an example of the AF process performed in a case where both the pair of horizontal line sensors 64H and the pair of vertical line sensors 64V have an assembly error, i.e., a case where, as shown in FIG. 3C, error in the positive direction (the direction in which the interval of the object images is increased) occurs in the pair of object images f2H projected on the pair of horizontal line sensors 64H, and error in the negative direction (the direction in which the interval of the object images is reduced) occurs in the pair of object images f 2V projected on the pair of vertical line sensors 64V.

The process from steps S71 through S75 of FIG. 11 is substantially the same as the process from steps S51 through S55 of FIG. 10. However, in step S75 of FIG. 11, the edge angle θ of the object image projected on the sensor pair is calculated from the phase difference p between the output signals Va and Vb of the two adjacent line sensor arrays a and b of the parallel line sensor for any one of the parallel line sensors of the pair of horizontal line sensors 64H and the pair of vertical line sensors 64V.

After the calculation of the edge angle θ of the object image in step S75, it is checked whether or not the edge angle θ is within a range of 0°<θ<30° or 150°<θ<180° (step S77). If the edge angle θ is within the range of 0°<θ<30° or 150°<θ<180°, the defocus calculation is performed using the output of the pair of horizontal line sensors 64H, and control proceeds to step S89 (step S77: YES, step S79). Whereas, if the edge angle θ is out of the range of 0°<θ<30° or 150°<θ<180° (step S77: NO), the defocus calculation is performed using the output of the pair of vertical line sensors 64V (step S81), and it is checked again whether or not the edge angle θ is within the range of 60°<θ<120° (step S83). If the edge angle θ is out of the range of 60°<θ<120°, the defocus calculation is performed using the output of the pair of horizontal line sensors 64H, and an average value of the defocus amount calculated from the output of the pair of vertical line sensors 64V and the defocus amount calculated from the output of the pair of horizontal line sensors 64H is calculated and obtained as the defocus amount. Thereafter, the control proceeds to step S89 (step S83: YES, step S85, S87). If the edge angle θ is within the range of 60°<θ<120°, control proceeds directly to step S89 (step S83: NO).

If the edge angle θ is within the range of 0°<θ<30° or 150°<θ<180°, the focal-shift amount of the pair of horizontal line sensors 64H falls within ±0.5° as shown in FIG. 5, and therefore, the output of the pair of horizontal line sensors 64H is used in the defocus calculation, whereby a favorable focus detection accuracy is maintained. If the edge angle θ is within the range of 60°<θ<120°, the focal-shift amount of the pair of vertical line sensors 64V falls within ±0.5 as shown in FIG. 5, and therefore, the output of the pair of vertical line sensors 64V is used in the defocus calculation, whereby a favorable focus detection accuracy is maintained. If the edge angle θ is within a range of 30°=θ≦60° or 120°=θ=150°, the absolute values of the focal-shift amounts of the pair of horizontal line sensors 64H and the pair of vertical line sensors 64V are larger than those obtained when the edge angle θ is within the above two ranges; however, the directions of focal shift are opposite to each other, and, at the same time, the absolute values are relatively close to each other. Therefore, an average value of the result of the defocus calculation using the output of the pair of horizontal line sensors 64H and the result of the defocus calculation using the output of the pair of vertical line sensors 64V is obtained as the defocus amount, whereby the focus detection accuracy can be enhanced. Also in this case, the specific numerical value of the edge angle θ (threshold value) by which the pairs of horizontal and vertical line sensors 64H and 64V are switched can be changed by a range within approximately ±10° in accordance with the degree of assembly error occurring due to, e.g., individual differences between different AF modules 60.

Thereafter, it is checked whether or not the defocus amount calculated in any of steps S79, S81, and S87 is smaller than a predetermined focus width (step S89). If the calculated defocus amount is smaller than the predetermined focus width, information indicating that an in-focus state is attained is displayed on the display panel 36 (step S89: YES, step S91). If the defocus amount is not less than the predetermined focus width, the number of pulses corresponding to the defocus amount is calculated (step S89: NO, step S93). The AF motor 33 is driven by the motor drive circuit 32 to move the focus adjustment optical system 56 until the calculated pulse number is reached (step S95).

As described above, in the present embodiment, the contour of an object (edge angle θ) is discriminated by the phase difference p of the output signal of each CCD line sensor (parallel line sensor) of the CCD focus detection element 64 (the pair of horizontal line sensors 64H and the pair of vertical line sensors 64V). According to the discrimination result, the defocus amount is corrected, or the sensor output used in the defocus calculation is selected. Therefore, influences of part accuracy of the separator lens 63 and the sensor assembly error can be reduced, and a favorable focus detection accuracy can be maintained for the object having a contrast component (luminance distribution) in the oblique direction. Specifically, according to the second embodiment, compared to a convention focus detection device, the amount of deviation in the focus detection in the pair of horizontal line sensors 64H and pair of vertical line sensors 64V can be improved to ±0.5° or less, throughout the edge angle θ.

In the first embodiment, the defocus amount is corrected according to the edge angle θ of the object image, and in the second embodiment, the output of the sensor pair to be used in the defocus calculation is selected according to the edge angle θ of the object image. However, the output of the sensor pair to be used in the defocus calculation can be selected according to the edge angle θ of the object image and the selected output of the sensor pair can be corrected based on correction information.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A focus detection device, which detects a defocus amount based on a phase difference between a pair of object images that are obtained by pupil division and projected onto a pair of areas on a line sensor, comprising:
    a parallel line sensor, constituting said line sensor, having two line sensor arrays arranged adjacently and in parallel to each other; and
    a correction calculator which corrects the defocus amount based on error correction information, wherein:
    the error correction information in which a focus detection error amount, which changes in accordance with the object image, corresponds to a phase difference between output signals of the two line sensor arrays of said parallel line sensor, and
    said correction calculator discriminates influence of an edge angle of the object image from the phase difference between the output signals of the two line sensor arrays of said parallel line sensor and corrects the defocus amount according to the discriminated edge angle.

2. The focus detection device according to claim 1, wherein said focus detection error amount is an error amount that changes in accordance with the edge angle of the object image.

3. The focus detection device according to claim 1, wherein said focus detection error amount is detected via measurement.

4. A focus detection device, which detects a defocus amount based on a phase difference between a pair of object images that are obtained by pupil division and projected onto a pair of focus detection areas on a line sensor, comprising:
    a pair of horizontal parallel line sensors, each of which constitutes said line sensor, disposed in the horizontal direction for use in vertical line detection and a pair of vertical parallel line sensors, each of which constitutes said line sensor, disposed in the vertical direction for use in horizontal line detection, wherein each said parallel line sensor includes two line sensor arrays that are arranged adjacently in parallel to each other;
    a discriminator which discriminates influence of an edge angle of the object image calculated from a phase difference between output signals of said two line sensor arrays of at least one said parallel line sensor;
    a selector, which selects a sensor output of one of said pair of horizontal parallel line sensors and said pair of vertical parallel line sensors, used in defocus calculation, according to the discriminated influence of the edge angle; and
    a calculator, which performs a defocus calculation based on said selected sensor output.

5. The focus detection device according to claim 4, wherein said one of the pair of horizontal parallel line sensors and the pair of vertical parallel line sensors, of which the sensor output is selected by said selector, has a smaller focal-shift amount in influence of the edge angle discriminated by the discriminator than that of the other of said pair of horizontal parallel line sensors and said pair of vertical parallel line sensors.

6. The focus detection device according to claim 4, wherein said selector selects both the pair of horizontal parallel line sensors and the pair of vertical parallel line sensors at influence of the edge angle when respective focal-shift amounts thereof fall within a predetermined value, and the calculator calculates an average value of a result of defocus calculation using the output of the pair of horizontal parallel line sensors and the result of defocus calculation using the output of the pair of vertical parallel line sensors, wherein said average value is obtained as a defocus amount.

7. A focus detection device, which detects a defocus amount based on a phase difference between a pair of object images that are obtained by pupil division and projected onto a pair of areas on a line sensor, the focus detection device comprising:
    a parallel line sensor composed of two line sensor arrays arranged adjacently and in parallel to each other; and
    a correction calculator that corrects the defocus amount based on error correction information, wherein:
    the defocus amount varies in accordance with an edge angle of the object images; and
    the error correction information in which a focus detection error amount, which changes in accordance with the object image, corresponds to the phase difference between the output finals of the two line sensor arrays of the parallel line sensor.

* * * * *